(12) United States Patent  (10) Patent No.: US 8,752,019 B2
Marquardt et al.  (45) Date of Patent: Jun. 10, 2014

(54) VERSION CONTROL FOR MEDICAL ANESTHESIA DEVICES

(75) Inventors: Klaus Marquardt, Lübeck (DE); Jens Fritz Köhne, Lübeck (DE)

(73) Assignee: Dräger Medical GmbH, Lübeck (DE)

( * ) Notice: Subject to any disclaimer, the term of this patent is extended or adjusted under 35 U.S.C. 154(b) by 117 days.

(21) Appl. No.: 13/564,846

(22) Filed: Aug. 2, 2012

(65) Prior Publication Data

US 2013/0191032 A1 Jul. 25, 2013

(30) Foreign Application Priority Data

Jan. 25, 2012 (DE) .......................... 10 2012 001 456

(51) Int. Cl.
*G06F 9/45* (2006.01)

(52) U.S. Cl.
USPC ........... 717/124; 717/126; 717/127; 717/128; 717/129

(58) Field of Classification Search
None
See application file for complete search history.

(56) References Cited

U.S. PATENT DOCUMENTS

| 6,363,282 | B1 | 3/2002 | Nichols et al. |
| 7,328,434 | B2 * | 2/2008 | Swanson et al. ............... 717/168 |
| 7,398,382 | B2 * | 7/2008 | Rothman et al. .................. 713/2 |
| 8,612,749 | B2 * | 12/2013 | Brown .......................... 713/158 |
| 2002/0077856 | A1 * | 6/2002 | Pawlikowski et al. ............. 705/2 |
| 2002/0133576 | A1 * | 9/2002 | Koymans et al. .............. 709/221 |
| 2006/0247606 | A1 * | 11/2006 | Batch ................................ 606/1 |
| 2008/0184219 | A1 * | 7/2008 | Matsumoto ................... 717/170 |
| 2009/0313470 | A1 * | 12/2009 | Bade et al. ..................... 713/169 |
| 2010/0262953 | A1 * | 10/2010 | Barboni et al. ................ 717/120 |
| 2011/0179405 | A1 * | 7/2011 | Dicks et al. .................... 717/168 |
| 2012/0096451 | A1 * | 4/2012 | Tenbarge et al. ............. 717/170 |
| 2012/0172687 | A1 * | 7/2012 | Wood ............................ 600/323 |

FOREIGN PATENT DOCUMENTS

DE 103 53 052 A1 6/2005

* cited by examiner

*Primary Examiner* — Isaac Tecklu
(74) *Attorney, Agent, or Firm* — McGlew and Tuttle, P.C.

(57) ABSTRACT

A testing system, a testing process, a medical device, e.g., an anesthesia device (G), and a computer program product are provided for testing installed program versions for acceptability. The anesthesia device (G) comprises a plurality of electronic components (K), which are operated and/or controlled with a program, which may have various versions. A release function (50) is activated for releasing the anesthesia device (G) or for putting same into operation only if a consistent set of acceptable program versions can be detected, and the anesthesia device (G) is otherwise blocked.

20 Claims, 2 Drawing Sheets

Figur 1

Figur 2

Figur 3

VERSION CONTROL FOR MEDICAL ANESTHESIA DEVICES

CROSS REFERENCE TO RELATED APPLICATIONS

This application claims the benefit of priority under 35 U.S.C. §119 of German Patent Application DE 10 2012 001 456.2 filed Jan. 25, 2012, the entire contents of which are incorporated herein by reference.

FIELD OF THE INVENTION

The present invention pertains to the fields of medical engineering and electronics or information technology. The present invention pertains, in particular, to the checking of medical devices, for example, anesthesia devices, which comprise a plurality components with programs, and different versions of the programs may be installed in the device.

BACKGROUND OF THE INVENTION

Medical devices, for example, anesthesia devices, are usually controlled nowadays by software and comprise components with a certain information technological infrastructure, which are, as a rule, designed with a microprocessor and programs running on them. Making different versions of the software causes different software versions to be able to be installed in the components of the device.

It is found problematic that not all combinations of program versions lead to an operational state of the device. Certain combinations prove to be incompatible, erroneous and therefore unacceptable and must be checked before putting into operation and/or before use of the device.

It is necessary for the medical devices being used to be inspected continuously for compliance with safety regulations. This checking is usually carried out manually by a technician. It is also checked in this case whether compatible software versions are always installed for controlling the device or for operating the device.

It is known in the state of the art that certain versions of the installed programs may lead to a disturbance or to an error. Therefore, one way of avoiding unacceptable combinations was to replace the entire software package (i.e., to replace all of the programs) if any change is made on the device or on a device component. This procedure is time-consuming and expensive, on the one hand, and is prone to error, on the other hand.

Furthermore, it is known that the installed program versions (e.g., patches or other correction deliveries of the software) can be checked by a service technician on site. All new deliveries of versions must then be validated (usually by the manufacturer of the device). The device could be delivered to the medical facility (e.g., hospital) or put into operation only after the acceptability of the program could be checked, which usually leads to considerable delays. These approaches are time-consuming and also prone to error because they are carried out manually.

SUMMARY OF THE INVENTION

An object of the present invention is therefore to provide a technical implementation, with which the checking of programs, especially the checking of installed components of program versions for acceptability, can be improved and carried out error-free for operating a medical device.

The present invention will be described below on the basis of the process. Embodiments, alternative solutions, further features and advantages mentioned here can also be extrapolated to other solutions to the above-mentioned problem (i.e., to the computer program product and to the testing system and/or the device) and vice versa. Accordingly, the features that are claimed and/or described in connection with the system can also be applied to the process, the device or the computer program product and vice versa. The respective functional features of the process are implemented by corresponding microprocessor modules or hardware modules, which are designed to assume the respective functionality.

According to one aspect, the present invention pertains to a process for checking a medical device or a system of devices, comprising a plurality of replaceable, separate components, wherein a component comprises a microprocessor and at least one executable program each, wherein the programs may be installed in different versions on the respective component, with the following process steps:

Automatically detecting all versions of all currently installed programs on all components of the medical device as an actual state of the device;

Accessing an acceptability memory, in which all acceptable combinations of versions are stored for the programs of the device components;

Checking to determine whether the detected actual state of the device is acceptable by accessing the acceptability memory and comparison with the entries being stored there; and Activating a release function to refresh or put into operation the medical device as a whole or individual functions of the device (if these can be activated separately) if the detected actual state of the device was checked as acceptable (otherwise, activation or retention of a blocking function, so that the device or device function cannot be operated).

The terms used within the framework of this application will be explained below.

The process is implemented on a computer and runs preferably fully automatically, i.e., without any interaction of a user. The process may be partly or entirely software-based. In addition, it is possible to embed or integrate the process or system as an embedded system in the anesthesia device or medical device and/or in a control computer (e.g., within the framework of a central server). The process is used to store, process and transmit processed data (in the form of acceptability and validation signals and a release and blocking signal) on the basis of computer-based technical devices (network) to other instances. The input variables for computation and/or processing (the components of the device) are addressed differently according to the present invention (in a version-specific manner) and are thus stored in a modified form. The process thus also takes into account the conditions of the data processing unit by checking the components and the programs thereof for the operation of the device.

The process is implemented, as a rule, on a computer. It may happen that certain process steps are wired as part of a microprocessor solution and thus hardwired, while other sections of the process are designed as software. Only individual sections or parts of the process would be implemented in software in this case. As a rule, all or selected sections of the process are coded in binary code or are in a digital form. All or some sections of the process may be provided as source code, as an already completely compiled code (machine code) or as interpreted code (e.g., in the interpreter languages Python, PHP, Ruby) or interpreted by means of an interpreter (e.g., Jit compiler). The program language in which the software is written (e.g., C++, Java, Perl or PHP, etc.) is irrelevant for carrying out the process according to the present invention and the other products being claimed. It is essential that the software is directly integrated as part of a technical system in the technical device and is used to control version installations there. The parts of the process according to the present invention, which are implemented as software, may be part of a so-called "embedded system," which is embedded in the surrounding medical system and interacts with same.

The medical device is usually an anesthesia device, comprising a plurality of processors with individual software or firmware, e.g., with a motherboard with two microprocessors, power supply units, etc. However, the present invention is not limited to anesthesia devices only, but it may also be used for respirators, heating beds, operating lamps, etc. The printed circuit boards (components) are provided, as a rule, with individual versions of firmware, which entail different updates, patches and/or changes. If, for example, the firmware of a first component was identified as erroneous and must therefore be replaced or changed, it may definitely happen that the other components with firmware do not also have to be replaced for this reason and can be maintained unchanged. This is carried out according to the present invention by checking or by the testing module. The management effort needed for the device can thus be markedly reduced according to the present invention. Nevertheless, it can be ensured that a consistency check is carried out for the control programs each time before the device is put into operation. However, the present invention can also be applied to other medical devices (e.g., laboratory devices, diagnostic medical devices, devices for measuring physiological parameters of a patient), which likewise comprise components that are controlled and/or operated by means of at least one program. The programs are implemented on the individual components and can usually run fully automatically (without interaction on the part of the user). As an alternative, the corresponding application comprises a user interface, via which a user can operate, control and/or check the medical device by means of the application.

The components are electronic, computer-based components, which can be replaced independently from one another. The components are, for example, gas sensors, pressure sensors, physiological parameters, power pack, RFID antenna and/or tag analysis. The components are connected to one another for data exchange by means of a network (or bus system, common resources, other interfaces and/or asynchronously by storage media). The components are operated with software or programs. These may be implemented as a microprocessor program in a nonvolatile electronic memory component (e.g., in an EPRROM or EEPROM and/or on mass storage units, e.g., HHD or SSD drives) or provided as software application or an applet. Each program is usually provided in a plurality of versions (e.g., due to changes in functions or error corrections) in the course of the product lifecycle. Besides an original version, correction versions, patches or new, improved versions (releases) are prepared within the framework of a product improvement, and these are then installed in the corresponding components of the device. In the preferred embodiment of the present invention, the components pertain to individual components of an anesthesia device or of another medical device. A medical device usually comprises a plurality of separate components. It is essential that the components may also be provided with (new) software independently from one another. For example, a download of software versions from a central server may be provided here, which may be triggered optionally by the components or by the server. Thus, both a replacement of the components per se (comprising device components) and a replacement of the control software for the components is possible. The replacement does not necessarily have to be performed by the user, but it may also be carried out within the framework of maintenance by a maintenance engineer, so that a replacement or a change on the device does not have to be directly visible to the device user and/or operator.

The set of acceptable combinations is preferably provided in a data bank. A retrieval system according to the present invention with a trunking function (e.g., by means of wild cards) may be provided for the search for acceptable combinations. The search for acceptable combinations of versions may be carried out centrally (in the department, in the medical facility and/or also on a central server, e.g., at Dräger Medical GmbH) or even locally by the corresponding device.

Each device component is usually controlled by a control program. A bijective (1:1) assignment between program and components is thus provided. As an alternative, other assignments are possible as well, so that, on the one hand, different programs can also be installed on a device component, and, on the other hand, a comprehensive program is provided for different device components.

The acceptability memory is a storage module, a memory card or a mobile data carrier (e.g., a USB stick). The memory can be written to and/or programmed (e.g., flash (E)EPROM, EPROM, PROM, etc.). The acceptability memory is preferably separated from a program memory physically (to increase safety). In an alternative embodiment of the present invention, the acceptability memory is not separated from the program memory physically but is separated logically. In an alternative, purely software-based variant of the present invention, the acceptability memory may also be designed as a data structure or data bank (e.g., in the mass storage unit, e.g., HDD, EPROM, which may also contain the program code itself), which can be accessed from the device in order to perform the version control according to the present invention. All acceptable combinations of program versions of all device components are stored in the acceptability memory. The set of acceptable program versions or software packages may also be called a "snapshot" and may usually be defined during the manufacture of the device and also during the operation of the device and/or dynamically adapted (changed). A "permissible" program combination consequently means a combination of program versions (of the activated components), which are functionally compatible and ensure error-free functional operation of the device. A set of acceptable program version combinations is generated in preconfigurable checks. This set is dynamically adaptable (and can be especially reduced and expanded). The checks are, e.g., release checks. The checks may be carried out centrally, e.g., in a verification department of the device manufacturer. Each combination ("snapshot") is released there by signature and then entered into a data bank for distribution to the devices. The checks can be automated. It is thus also possible to integrate external verification service providers and to integrate the verified results thereof in the data bank. The device manufacturer provides a master data bank for released combinations and ensures the adaptation or supplementation thereof.

A release or release function is provided according to the present invention (preferably as part of a release and blocking) The release is a setting of the device that can trigger putting into operation of the corresponding medical device or of a separately activatable device function or prevent it (as a blocking function). The release function depends on the check result. In other words, the release is activated when the version check has been successfully completed, and the blocking is otherwise activated, so that the respective device or device function is not able to be used and a change of the component programs must first be carried out. The release function is thus used for the direct control of the medical device. Provisions are made, as a rule, for a blocking to be activated at first, so that the device cannot be operated without a version check. The release for putting the device into operation or for releasing the device function can only be activated after the version check is successfully concluded. Depending on the embodiment, the release (used synonymously for the release and blocking) has a different scope. Thus, it may pertain to the entire device in a first variant, and it may pertain to individual device functions only in a second variant. Individual device functions can then be released or blocked based on the checking in the second variant. For example, another gas-measuring component may be used in an anesthesia device (the replacement may also be carried out, for example, during the operation). The entire device will then usually continue to operate, but individual device functions, for example, the adjustment to a certain gas concentration when the measured value has become too inaccurate, are not supported any longer. The checking and release or blocking according to the teaching of the present invention is also possible after the entire device has been put into operation.

Checking preferably takes place fully automatically and comprises a comparison with entries from the acceptability memory. The checking is aimed especially at determining whether a combination of currently installed program versions is acceptable. The checking may be performed depending on the (geographic) location, because specific release procedures apply to some countries/regions, so that certain versions and combinations thereof must not be put into operation at each location. In another advantageous embodiment, the checking may be performed as a function of the intended use. More complex variants comprise further checking procedures, such as successful authorization, a checking to determine whether the program in question is also installed on the "correct" component (after previous assignment), and a checking to determine whether the version is also the most up-to-date version available.

According to a preferred embodiment of the present invention, the acceptability memory can be updated dynamically. The updating of the acceptability memory may be carried out, on the hand, before the device is put into operation (for the first time) and also later, during the (clinical or other) use of the medical device. The updating may be carried out by synchronization with a central server and/or by installing updated entries (e.g., via a network connection, for example, Internet). As an alternative, the medical device may also be updated via a corresponding (wired or wireless) connection with a service PC. Further installation possibilities pertain to storage media and/or also components newly added to the device. Furthermore, it is also possible to bring the medical device into data exchange with updated acceptability information via plug-in components (comprising memory cards or sticks, etc.). The updated acceptability data may likewise be stored directly on the plug-in components and thus read into the device. Moreover, it is possible to bring the replaceable components of the device and/or the sensors themselves, etc., into data exchange with updated acceptability information, because their communication protocol must correspondingly allow the updating. The flexibility of the version check according to the present invention can thus be increased, because the installation of updated permissibility data is not limited to a certain form for providing the acceptability data.

According to another aspect of the present invention, the checking may also be triggered by the central instance. It is thus possible to recall certain combinations, i.e., to withdraw releases again. This embodiment is used, among other things, if the central instance receives problem reports that signal that the implemented combination is not acceptable on the device or cannot be verified.

According to one aspect of the present invention operator data (i.e., data that are relevant for the operation and functionality of the device in question) are stored separately from the acceptability data. In particular, the programs are stored in another memory (the program memory) or in another memory area, which is separate from the acceptability memory and/or can be accessed separately from the acceptability memory. The term "separately" comprises a physical and a logical separation of the respective memories (memory areas). This embodiment implies the advantage that the version check can only be corrupted with difficulty based on separate storage. Another advantage is that the programs proper can be released for a clinical application (CE logo certification), and the release does not have to be renewed by making changes on the acceptability memory, because the program is not changed. The safety of the version check and hence also the safety of the medical device can thus be improved. Furthermore, it is thus possible to separate the checking of the device (especially the version check) from the operation of the device proper.

To make it possible to further increase the safety of the version check, provisions are made in an advantageous variant of the present invention for the acceptability memory to be secured. In particular, changes (comprising new entries, changes in existing entries as well as deletions of entries) can be only be performed after a successful authentication (e.g., by a digital signature of the change data or by a coded transmission, whose successful decoding authenticates the sender as being trustworthy). To make it possible to increase safety even further, provisions may be made for the entries to be stored in a coded form in the acceptability memory, so that they cannot be read even by an authenticated user without decoding. For example, a symmetrical or asymmetrical coding method (e.g., one based on the RSA algorithm) may be used for this.

The version check according to the present invention is preferably carried out in the testing module. The testing module may be installed or implemented as a software tool on the device. It is also possible as an alternative to provide the testing module on a central computer-based instance and to connect to the respective devices. It is also possible to provide the testing module on selected devices only, via which other devices (connected via a corresponding data connection) can then be checked indirectly. This has the advantage that not all medical devices need to be provided with a testing module. This proves to be especially meaningful if a group of medical devices must be usually combined. Depending on the embodiment, different scenarios can be implemented for activating the testing module. Provisions are usually made for the testing module to be automatically activated each time before the medical device is put into operation. As an alternative or cumulatively, the testing module may also be automatically activated after detection of a change on a medical device and/or at preconfigurable time intervals and/or events. It is also possible that the blocking function of the testing module is preconfigured or activated after a change detected on the medical device. It can thus be advantageously ensured that program versions are always and automatically checked for acceptability if a change was recognized on the device. If, for example, a device component was replaced or a new version of the control software was installed, the device can only be put into operation if the version check could be carried out successfully.

Provisions are made according to another aspect of the present invention for sending an acceptability signal in case of successful version check. This can be displayed, for example, on a user interface of the medical device (if such a user interface is present) and/or it can be transmitted to a central server. The acceptability signal may also be implemented as a value (flag) or change in a memory cell. No independent physical design is required. If checking failed, an error signal can be sent. As an alternative, the error signal may be transmitted to a control computer (e.g., central server) in order to trigger further steps. For example, the reinstallation of program versions can be triggered here, or a service technician can be informed via an Internet connection.

Another solution to the problem is in a medical device on which the above-described release and blocking function is implemented for version checking.

The release and blocking function runs fully automatically (without interaction on the part of the user) and is triggered, in particular, before putting the device into operation and in case of changes (on components) of the device. In another advantageous embodiment of the present invention, the device comprises, besides the release and blocking function, testing module and/or acceptability memory (however, this is not absolutely necessary and optional only). In other words, the testing module may likewise be installed on the device or on another computer-based instance, which is in data exchange with the device. This reduces the effort needed for installation in the devices and increases flexibility in connection in implementing the testing process according to the present invention. More complex variants of the device comprise, moreover, additional modules as well (as was already described above in connection with the process: A module for checking authorization, an assignment testing module, etc.).

Another solution to the above-mentioned problem is a testing system for a medical device. According to one aspect of the present invention, the testing system comprises an acceptability memory, in which acceptable combinations of versions for the control programs of the components are stored, a release and blocking function, and a testing module. It shall be expressly pointed out that the scope of protection of this application is not limited to all the above-mentioned modules or components of the system (testing module, acceptability memory, release and blocking function) having to be provided on the same instance (device and/or central server or other instances). The acceptability memory, release and blocking function and testing module are provided on the respective device in a preferred embodiment. It is also possible as an alternative to provide only release and blocking function on the device and to provide the acceptability memory and testing module on connectable computer-based instances.

Safety gaps, which develop due to inconsistent control versions for the device components and would compromise the functionality of the device, can be closed with the testing system or testing module according to the present invention.

The testing module is preferably embedded in a technical means or in the medical device. The testing module is used to process, store and/or transmit test data relating to the medical device. The release and blocking function controls the release and/or putting into operation of the medical device and thus pertains to the direct cooperation between the devices or connected, computer-based instances. It can be ensured according to the present invention that a medical device is operated only if a version check could be successfully concluded. Both the device as a whole and the device component are thus operated in a modified manner. Connection of the device (possibly after known authorization procedures) previously led directly to the device being put into operation. The connection or integration of the device into the medical system (e.g., operating system) leads according to the present invention to automatic triggering of the testing function or of the testing module. Device components are thus addressed differently. The data processing program used for version testing is in data exchange (especially via the code of the versions of the components, as well as the release and blocking signal) with all device and/or hardware components of the medical device.

According to one aspect, the testing of the installed versions for acceptability according to the present invention may also be carried out within the framework of the automatic self test of the device.

To increase security further, provisions may be made for the version checking to be carried out automatically after configurable time intervals and/or after configurable events (especially in case of a change detected in the device or a change on other components of the higher-level system). In a preferred embodiment, the above-mentioned events comprise:

Connection of the device
Receipt of a test command from a central instance
A change on a component
A change of the available components
A change in the contents of the acceptability memory.

The version check is applied or implemented, in principle, on two hierarchy levels. The version check is performed
  for a device with a number of (identical or different) components and
  for a system or system of devices, in which each device plays the role of a component.

It is possible, if necessary, to display the detected actual state on a user interface (on the device to be checked, on a specific monitor and/or on a central server). An assignment between the components and the program versions installed thereon may be displayed in this case as well in order to display, for example, relevant maintenance data to a maintenance engineer.

The acceptable combinations of versions for the device component programs (snapshot) may be device-specific, so that the set may differ from one device to the next. As an alternative, the snapshot may also depend on the particular operation of the device, i.e., it may consequently be application-specific.

The testing module is intended to automatically detect as actual state of the device all versions of all currently installed programs. The actual state of the device can then be compared (if needed, especially after detecting a change) with a desired state as a set of acceptable states. The set of all acceptable states is stored in an acceptability memory. Consequently, as soon as a new program version is installed for only one device component or for a plurality of device components, the actual state changes and is automatically updated in order to make it possible to trigger the version check. It is in this case taken into account that a local change (e.g., expansion) on a component does, as a rule, affect only very few other components, so that the installation of a complete software package (for all components) is not necessary according to the present invention to make it possible to ensure error-free operation of the device. It is thus advantageously possible to markedly reduce the effort needed for management for checking the operation of the device and, on the other hand, also the effort needed to provide the update versions.

The above-described embodiments of the process according to the present invention may also be designed as a computer program product with a computer program, wherein the computer is caused to carry out the above-described process according to the present invention when the computer program is loaded on or executed on the computer or on a processor of the computer.

An alternative solution to the problem also lies in a computer program with computer program code for carrying out all process steps of the process being claimed or described above when the computer program is executed on the computer. The computer program may also be stored on a machine-readable storage medium or downloaded via an interface from a computer instance.

An alternative solution to the problem provides for a storage medium, which is intended for storing the above-described, computer-implemented process and can be read by a computer.

The fact that not all steps of the process need to be necessarily executed on one and the same computer instance but they can also be executed on different computer instances lies within the scope of the present invention. The sequence of the process steps may also be varied if needed.

In addition, it is possible that individual sections of the above-described process can be executed in a commercially available unit and the remaining components in another commercially available unit, quasi as a split system.

Exemplary embodiments, which are not to be considered to be limiting examples, their features and further advantages will be discussed in the following detailed description of the figures on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
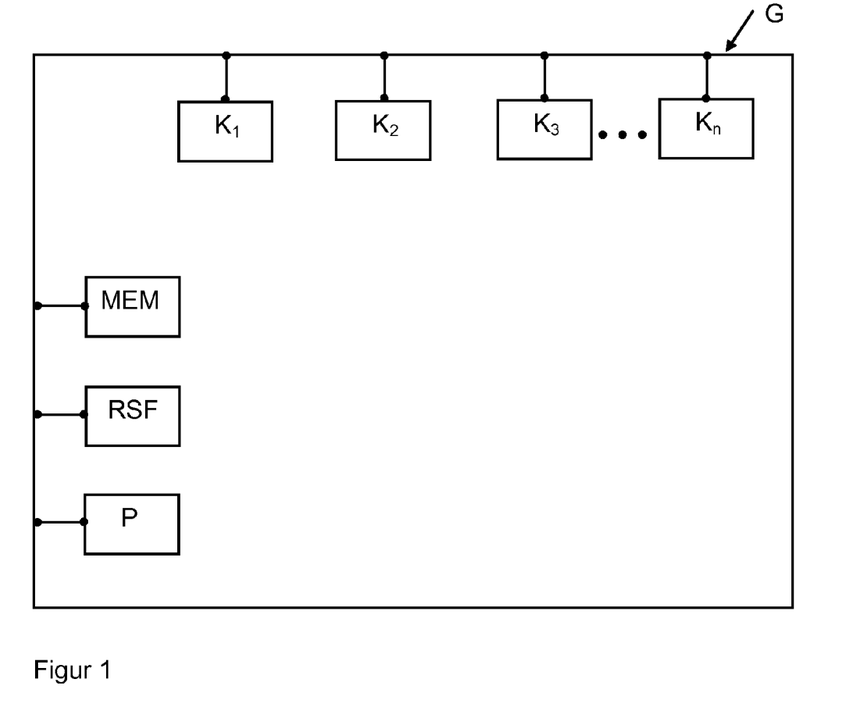
FIG. 1 is a synoptic view of a medical device corresponding to a preferred embodiment of the present invention.

Referring to the drawings in particular, FIG. 1 shows in a schematic form the design of a medical device expanded according to the present invention, especially of an anesthesia device, which is designated by reference symbol G in the figures. Anesthesia device G comprises a plurality of components and/or electronic components K, which are controlled and/or operated via a computer program, e.g., programs for measuring flow and pressure, for measuring the concentrations of various gases (at times as several such programs), for reading and analyzing RFIDs, for measuring physiological data of the patient and/or a power pack. The principles according to the present invention may be applied, furthermore, e.g., to the following components K: To a flowmeter (rotameter) for determining the rate of flow of gases, to an ORC system (Oxygen Ratio Controller) or improvements, such as a sensitive ORC and, depending on the orientation of device G, also to an electronically operating measuring sensor (flow sensor) for determining the percentages of the respective gases or for measuring the breath volumes and respiratory minute volumes. Further applications pertain, for example, to an electronic volumeter, an electronic manometer and other electronic components, which are in data exchange via a bus system.

Besides the above-mentioned components, device G also comprises further motherboards K, and further components K, which are usually shipped with individual firmware versions. The individual programs are subject to different update cycles. If, for example, a bug can be fixed on the PGM (programmable) firmware, it is not necessary according to the present invention to change the entire software for operating device G or to change programs of other components if these are not affected by the bug fix of the PGM firmware.

Moreover, the anesthesia device G comprises an acceptability memory MEM, a release and blocking function RSF and a testing module P. The above-described exemplary embodiments of anesthesia device G should, however, be considered to be examples only and may be combined in alternative embodiments and/or also comprises additional building blocks (also non-electronic ones) and components K.

Figure 2:
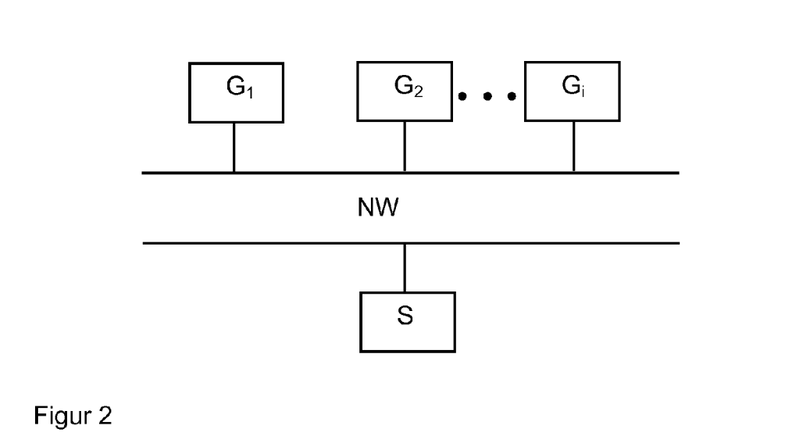
FIG. 2 is a schematic view of a system, comprising a plurality of medical devices according to one embodiment of the present invention.

FIG. 2 shows a (likewise schematic) synoptic view of a plurality of devices and the integration thereof in an overall system. Thus, a first device G1, a second device G2, a third device G3, etc., are connected via a network NW with a central server S. The medical devices (especially anesthesia devices) G are expended according to the present invention such that they comprise the release and blocking function RSF, which block the device and do not switch it to the operational state in case of unsuccessful version check and which release the corresponding device G for being put into operation in case of successful version check. The checking of the program versions for consistency may be carried out within device G but also externally. The result of the checking is transmitted to device G in the latter case in order to make it possible to correspondingly actuate the release and blocking function RSF.

Figure 3:
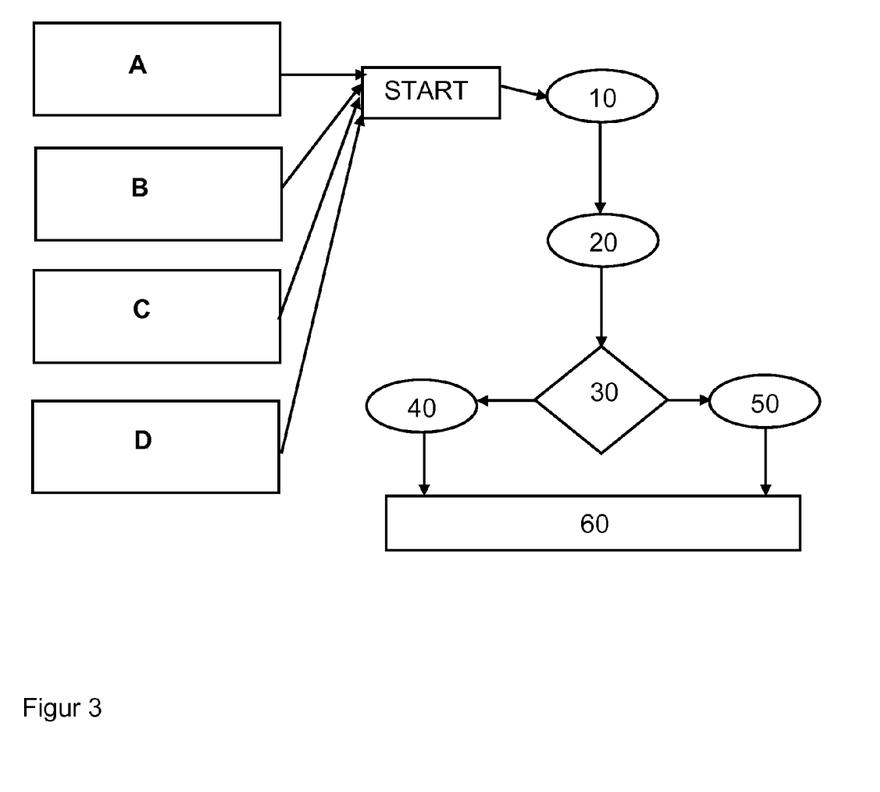
FIG. 3 is a data flow chart of a version check process corresponding to a preferred embodiment of the present invention.

The course of a checking process according to the present invention will be described in more detail below according to a preferred embodiment with reference to FIG. 3.

The process is started automatically by preconfigurable trigger signals. If one of the trigger signals is detected on device G and/or on the central server S, checking is started (automatically). The following trigger signals are provided according to a preferred embodiment:

A: Connection of device G or connection or activation of a component K of device G
B: At least one component K was changed
C: At least one configuration was changed
D: The contents of an acceptability memory MEM were changed.

Even more trigger signals, which may pertain, e.g., to an event of the system of devices (power failure, etc.) may be defined in alternative embodiments.

After starting the process, an acceptability memory MEM is accessed in step 10. Acceptability memory MEM comprises entries for all acceptable combinations of versions for the component programs (i.e., for the control software of the participating components K of device G). The acceptability memory MEM is provided on device G, as was already described above with reference to FIG. 1.

Automatic detection of an actual state of the device takes place in step 20. The actual state of the device can also be called a snapshot and comprises all consistent program versions. This set comprises, in particular, all relevant components K of device G (i.e., the components K that are activated and needed for the operation/current application) and the control programs thereof for components K. All combinations of versions of component programs, for which no error-free device function can be demonstrated, are not written into the acceptability memory MEM. According to the preferred embodiment of the present invention, the acceptable versions are thus stored in acceptability memory MEM. As an alternative, the logical opposite may also be written to the memory and the memory will then comprise only incompatible or inconsistent versions, which would lead to an error of the device (the comparison between the actual state and the entries stored in memory MEM will then lead during the checking to the triggering of the blocking function in case of agreement). The combinations of programs for which bugs were detected are stored in a bug memory in a preferred embodiment. If such an (unacceptable) version or combination was recognized during the detection of the actual state, an alarm signal is automatically sent.

The version check proper is performed in the next process step 30. The detected state of the device, the actual state of the device, is compared here with a set of acceptable states. The set of acceptable states is stored in acceptability memory MEM. The result of the checking has, in principle, two outputs:

1. If the test takes place successfully and it can be ensured that an acceptable version of control programs is installed on the particular device G, the release function is activated in step 50 and device G is put into operation or is released for being put into operation.
2. If the version check failed to lead to a successful test result, a blocking function 40 is activated. Blocking function 40 is preferably already preconfigured in the preferred embodiment. so that no further switching or no change is necessary here. The device remains blocked and is not able to operate in this case. The process can then end or it is carried out iteratively for a new actual state of the device (this shall be designated by reference number 60 in FIG. 3, which represents a state that can be described by "wait for trigger signal"). As soon as a change was detected on device G, the process step can be carried out once again or branch off to step 20 for detecting the actual state of the device and carry out steps 20 and 30 iteratively if a trigger signal (e.g., a modified state of the device) could be detected.

The basic idea of the present invention is, in principle, independent from the type of the control program. It may be embedded software (firmware), which is stored, for example, in a flash memory, in an (E)EPROM or ROM. The program is designed, in principle, as a control program and is used to control the electronic components K. It comprises executable code and may, moreover, also comprise data, data structures, configuration files and meta data.

It advantageously becomes possible due to the central detection and/or storage of acceptable program (version) combinations to always keep this empirical knowledge up to date and to also provide it locally on all connected devices G. The effort needed for management for checking for the ability of the device G to operate can thus be markedly reduced according to the present invention. The costs and time needed for carrying out software updates for certain components K is also eliminated if only other device components K have been changed, which do not affect the other components K whatsoever. The detection of acceptable programs or program versions may be collected at a central location for all connected devices G over the entire operating time of the corresponding device G. In case of a singular change on a component K (e.g., due to the installation of a functional expansion, of a so-called fix, of a new patch, or of a release), it is advantageously possible to perform a targeted analysis to determine the effects this has for the other components K. In particular, it is no longer necessary to install the entire software package for all components K anew. It is thus advantageously possible to perform a check in a specific manner to determine which components K require a new control software.

Provisions are made in an alternative embodiment of the present invention for not providing a central server S. The testing process is carried out locally on the devices G. The acceptability memory MEM is preferably maintained and updated locally on all devices G or it is read always in the updated form via a data connection (e.g., memory stick or network connection), so that it is ensured that the current desired state of acceptable version combinations is always stored on all devices G.

Provisions are made in an advantageous variant of the present invention in case of a negative test result (i.e., if test step 30 has revealed an unacceptable combination of control programs) for a fallback function to be provided on device G. The fallback function is used to restore a previous, permissible state of the device. This proves to be advantageous especially if the anesthesia device G is used in clinical application for emergency scenarios (e.g., operating room) and the operation of device G with obsolete control programs is favored compared to a situation in which an unacceptable combination must be determined at first even though the most recent version of control programs is installed. If device G has a user interface, provisions may be made for providing a plurality of selectable entries for the application of the fallback strategy, which the user can then select entering a selection signal. In particular, the user can in this case select the permissible combination of program versions that he would like to fall back on.

Provisions are made according to another aspect of the present invention for a log file to be maintained for each device G or for selective devices G, in which all test results are stored locally, especially with additional meta data, e.g., the time of checking, user, hospital, department, etc. This has the advantage that more information can be provided even on past states of the devices during maintenance of the device. It is thus possible, in particular, to model the scenario that hospitals or hospital departments replace their devices G and this can be covered with the checking. These data would be imaged in this case in the meta data and the version check is carried out automatically in case of each new use of the device (new department).

Since the writing to the acceptability memory MEM is a task that is critical for safety, increased safety requirements are to be provided for the access to the acceptability memory MEM for writing. In particular, provisions are thus made for the access to be able to be executed in a signed form only after successful authentication. Furthermore, only authorized users can access the acceptability memory MEM for writing.

According to a preferred embodiment, testing module P is activated each time before device G is put into operation and after each maintenance operation and after each change on device G.

It shall finally be pointed out that the description of the present invention and the exemplary embodiments should not, in principle, be considered to be limited in respect to a certain physical embodiment of the present invention. It is, in particular, apparent to a person skilled in the art that the present invention can be embodied such that it is divided partly or entirely into software and/or hardware and/or to a plurality of physical products, especially also computer program products in this case. While specific embodiments of the invention have been shown and described in detail to illustrate the application of the principles of the invention, it will be understood that the invention may be embodied otherwise without departing from such principles.

APPENDIX

List of Reference Characters

10 Access to the acceptability memory
20 Detection of the actual state of the device
30 Checking for acceptable combination of program versions
40 Activate blocking function
50 Activate release function
60 End or waiting for trigger signal
G Anesthesia device
K Component of anesthesia device
MEM Acceptability memory
P Testing module
RSF Release and blocking function
NW Network
S Central server
A Connection
B Component changed
C Configuration changed
D Acceptability memory (content) changed

What is claimed is:

1. A testing system for a medical device or for a system of medical devices, the medical device comprising a plurality of components, each of said components comprising a microprocessor and an executable program, wherein said executable program may be installed in different program versions on the respective component and wherein said executable program installed on the respective component can be replaced and/or changed independently from one another, the testing system comprising:
an access module or an acceptability memory provided for the medical device or for the system of medical devices, said access module or acceptability memory storing entries for all acceptable combinations of program versions for the executable programs of said components;
a release and blocking device provided on the medical device or on each medical device of the system of medical devices, said release and blocking device controlling the initiation of operation of the medical device or each medical device of the system of medical devices or controlling the initiation of operation of individual functions of the medical device or each medical device of the system of medical devices;
a testing module provided for the medical device or for the system of medical devices detecting all program versions of all currently installed programs automatically as an actual state of the medical device or each medical device of the system of medical devices and checking said access module or acceptability memory as to whether the detected actual state of the medical device or each medical device of the system of medical devices exists as an acceptable state in the acceptability memory as an entry and to activate a release by said release and blocking device to allow initiation of operation of the medical device or each medical device of the system of medical devices or to allow the initiation of operation of individual functions of the medical device or each medical device of the system of medical devices only if the detected actual state of the medical device or each medical device of the system of medical devices exists as an acceptable state in the acceptability memory as an entry, wherein: the test module is provided with access to the access module or the acceptability memory;
the testing module automatically detects all versions of all currently installed programs on all components of the medical device or system of medical devices as an actual state of the device;
the testing module tests to determine whether the detected actual state of the device is acceptable by accessing the access module or an acceptability memory; and the testing module activates a release by said release and blocking device.

2. A testing system in accordance with claim 1, wherein said testing module is preconfigured to actuate a blocking by said release and blocking device wherein the release is activated subsequently only if the detected actual state of the medical device or each medical device of the system of medical devices exists as an acceptable state in the acceptability memory as an entry.

3. A testing system in accordance with claim 1, wherein said access module or acceptability memory is dynamically updated by synchronization with a central server and/or by installing updated entries via an interface and/or a network connection.

4. A testing system in accordance with claim 1, the medical device includes a medical device program memory or the system of medical devices includes at least one medical device program memory wherein said access module or acceptability memory is separated from said medical device program memory or said at least one medical device program memory.

5. A testing system in accordance with claim 1, wherein said access module or acceptability memory comprises a secured memory in which additions, changes and/or deletions can be executed in an authenticated form only.

6. A testing system in accordance with claim 1, wherein said testing module is automatically activated after detection of a trigger signal which trigger signal is generated at least one of:
after a change on the medical device;
after each change on a component;
after each change in configuration;
after each change on the acceptability memory; and
each time before the medical device is put into operation.

7. A testing system in accordance with claim 1, wherein an acceptability signal is generated if said testing module determines that the detected actual state of the device exists as an acceptable state in the access module or acceptability memory and/or that an acceptability signal is transmitted in the signed form to other computer-based instances.

8. A medical device comprising:
a plurality of replaceable, separate components, wherein each component comprises a microprocessor and at least one executable program, wherein the programs may be installed in different versions on the respective component; and
a testing system comprising:
an access module or an acceptability memory provided for the medical device or for a system of medical devices including the medical device, said access module or acceptability memory storing entries for all acceptable combinations of program versions for the executable programs of said components;

a release and blocking device provided on the medical device or on each medical device of the system of medical devices, said release and blocking device controlling the initiation of operation of the medical device or each medical device of the system of medical devices or controlling the initiation of operation of individual functions of the medical device or each medical device of the system of medical devices;

a testing module provided for the medical device or for the system of medical devices detecting all program versions of all currently installed programs automatically as an actual state of the medical device or each medical device of the system of medical devices and checking said access module or acceptability memory as to whether the detected actual state of the medical device or each medical device of the system of medical devices exists as an acceptable state in the acceptability memory as an entry and to activate a release by said release and blocking device to allow initiation of operation of the medical device or each medical device of the system of medical devices or to allow the initiation of operation of individual functions of the medical device or each medical device of the system of medical devices only if the detected actual state of the medical device or each medical device of the system of medical devices exists as an acceptable state in the acceptability memory as an entry, wherein: the test module is provided with access to the access module or the acceptability memory;

the testing module automatically detects all versions of all currently installed programs on all components of the medical device or system of medical devices as an actual state of the device;

the testing module tests to determine whether the detected actual state of the device is acceptable by accessing the access module or an acceptability memory; and the testing module activates a release by said release and blocking device.

9. A medical device in accordance with claim 8, wherein said testing module is preconfigured to actuate a blocking by said release and blocking device wherein the release is activated subsequently only if the detected actual state of the medical device or each medical device of the system of medical devices exists as an acceptable state in the acceptability memory as an entry.

10. A medical device in accordance with claim 8, wherein said access module or acceptability memory is dynamically updated by synchronization with a central server and/or by installing updated entries via an interface and/or a network connection.

11. A medical device in accordance with claim 8, the medical device includes a medical device program memory or the system of medical devices includes at least one medical device program memory wherein said access module or acceptability memory is separated from said medical device program memory or said at least one medical device program memory.

12. A medical device in accordance with claim 8, wherein said access module or acceptability memory comprises a secured memory in which additions, changes and/or deletions can be executed in an authenticated form only.

13. A medical device in accordance with claim 8, wherein said testing module is automatically activated after detection of a trigger signal which trigger signal is generated at least one of:

after a change on the medical device;

after each change on a component;

after each change in configuration;

after each change on the acceptability memory; and each time before the medical device is put into operation.

14. A process for testing a medical device or a system of medical devices, the medical device comprising a plurality of components, each of said components comprising a microprocessor and an executable program, wherein said executable program may be installed in different program versions on the respective component and wherein said executable program installed on the respective component can be replaced and/or changed independently from one another, the process comprising the steps of:

providing a testing system comprising:

an access module or an acceptability memory provided for the medical device or for the system of medical devices, said access module or acceptability memory storing entries for all acceptable combinations of program versions for the executable programs of said components;

a release and blocking device provided on the medical device or on each medical device of the system of medical devices, said release and blocking device controlling the initiation of operation of the medical device or each medical device of the system of medical devices or controlling the initiation of operation of individual functions of the medical device or each medical device of the system of medical devices;

a testing module provided for the medical device or for the system of medical devices detecting all program versions of all currently installed programs automatically as an actual state of the medical device or each medical device of the system of medical devices and checking said access module or acceptability memory as to whether the detected actual state of the medical device or each medical device of the system of medical devices exists as an acceptable state in the acceptability memory as an entry and to activate a release by said release and blocking device to allow initiation of operation of the medical device or each medical device of the system of medical devices or to allow the initiation of operation of individual functions of the medical device or each medical device of the system of medical devices only if the detected actual state of the medical device or each medical device of the system of medical devices exists as an acceptable state in the acceptability memory as an entry;

providing access to the access module or the acceptability memory;

automatically detecting all versions of all currently installed programs on all components of the medical device or system of medical devices as an actual state of the device;

testing to determine whether the detected actual state of the device is acceptable by accessing the access module or an acceptability memory; and activating a release by said release and blocking device.

15. A process in accordance with claim 14, wherein said step of activating a release includes changing from a preconfigured blocking function of medical device to a release function for putting the medical device into operation or for releasing a tested function of the device if the detected actual state of the device was checked as permissible.

16. A process in accordance with claim 14, wherein said testing module is preconfigured to actuate a blocking by said release and blocking device wherein the release is activated subsequently only if the detected actual state of the medical device or each medical device of the system of medical devices exists as an acceptable state in the acceptability memory as an entry.

17. A process in accordance with claim 14, wherein said access module or acceptability memory is dynamically updated by synchronization with a central server and/or by installing updated entries via an interface and/or a network connection.

18. A process in accordance with claim 14, the medical device includes a medical device program memory or the system of medical devices includes at least one medical device program memory wherein said access module or acceptability memory is separated from said medical device program memory or said at least one medical device program memory.

19. A process in accordance with claim 14, wherein said access module or acceptability memory comprises a secured memory in which additions, changes and/or deletions can be executed in an authenticated form only.

20. A computer program product, wherein the computer program product comprises a computer program, which is stored in a memory of a computer, or and which comprises commands readable by the computer, for use with a medical device comprising a plurality of components, each of said components comprising a microprocessor and an executable program, wherein said executable program may be installed in different program versions on the respective component and wherein said executable program installed on the respective component can be replaced and/or changed independently from one another, and with a testing system comprising:

an access module or an acceptability memory provided for the medical device or for the system of medical devices, said access module or acceptability memory storing entries for all acceptable combinations of program versions for the executable programs of said components;

a release and blocking device provided on the medical device or on each medical device of the system of medical devices, said release and blocking device controlling the initiation of operation of the medical device or each medical device of the system of medical devices or controlling the initiation of operation of individual functions of the medical device or each medical device of the system of medical devices;

a testing module provided for the medical device or for the system of medical devices detecting all program versions of all currently installed programs automatically as an actual state of the medical device or each medical device of the system of medical devices and checking said access module or acceptability memory as to whether the detected actual state of the medical device or each medical device of the system of medical devices exists as an acceptable state in the acceptability memory as an entry and to activate a release by said release and blocking device to allow initiation of operation of the medical device or each medical device of the system of medical devices or to allow the initiation of operation of individual functions of the medical device or each medical device of the system of medical devices only if the detected actual state of the medical device or each medical device of the system of medical devices exists as an acceptable state in the acceptability memory as an entry, the computer program product comprising commands for carrying out the process comprising the steps of:

providing access to the access module or the acceptability memory;

automatically detecting all versions of all currently installed programs on all components of the medical device or system of medical devices as an actual state of the device;

testing to determine whether the detected actual state of the device is acceptable by accessing the access module or an acceptability memory; and activating a release by said release and blocking device.

* * * * *